April 3, 1956 C. O. GRINER 2,740,348
OUTLET DAMPER ASSEMBLY
Filed July 6, 1953 2 Sheets-Sheet 1
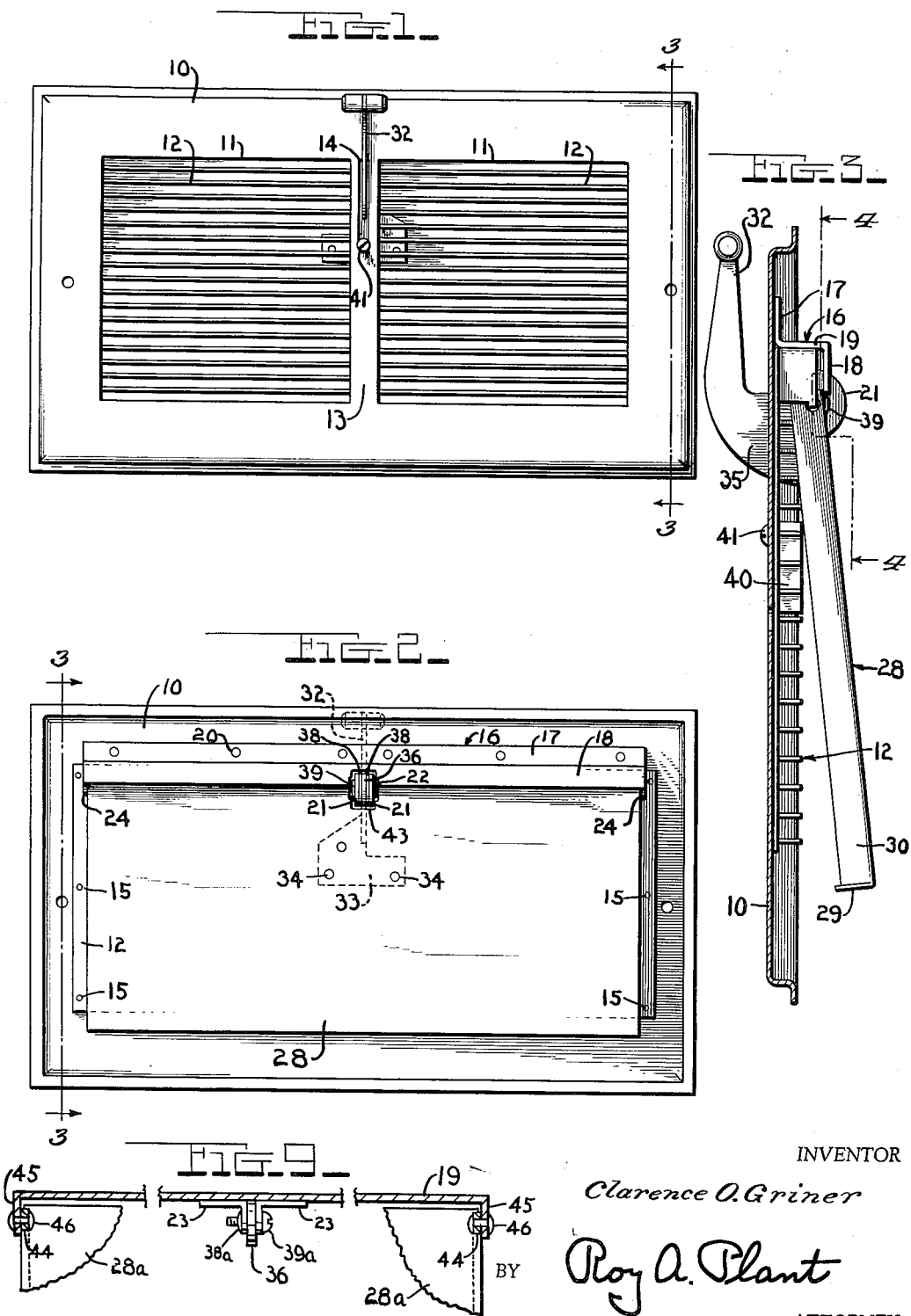
INVENTOR
Clarence O. Griner
BY Roy A. Plant
ATTORNEY April 3, 1956
C. O. GRINER
2,740,348
OUTLET DAMPER ASSEMBLY
Filed July 6, 1953
2 Sheets-Sheet 2
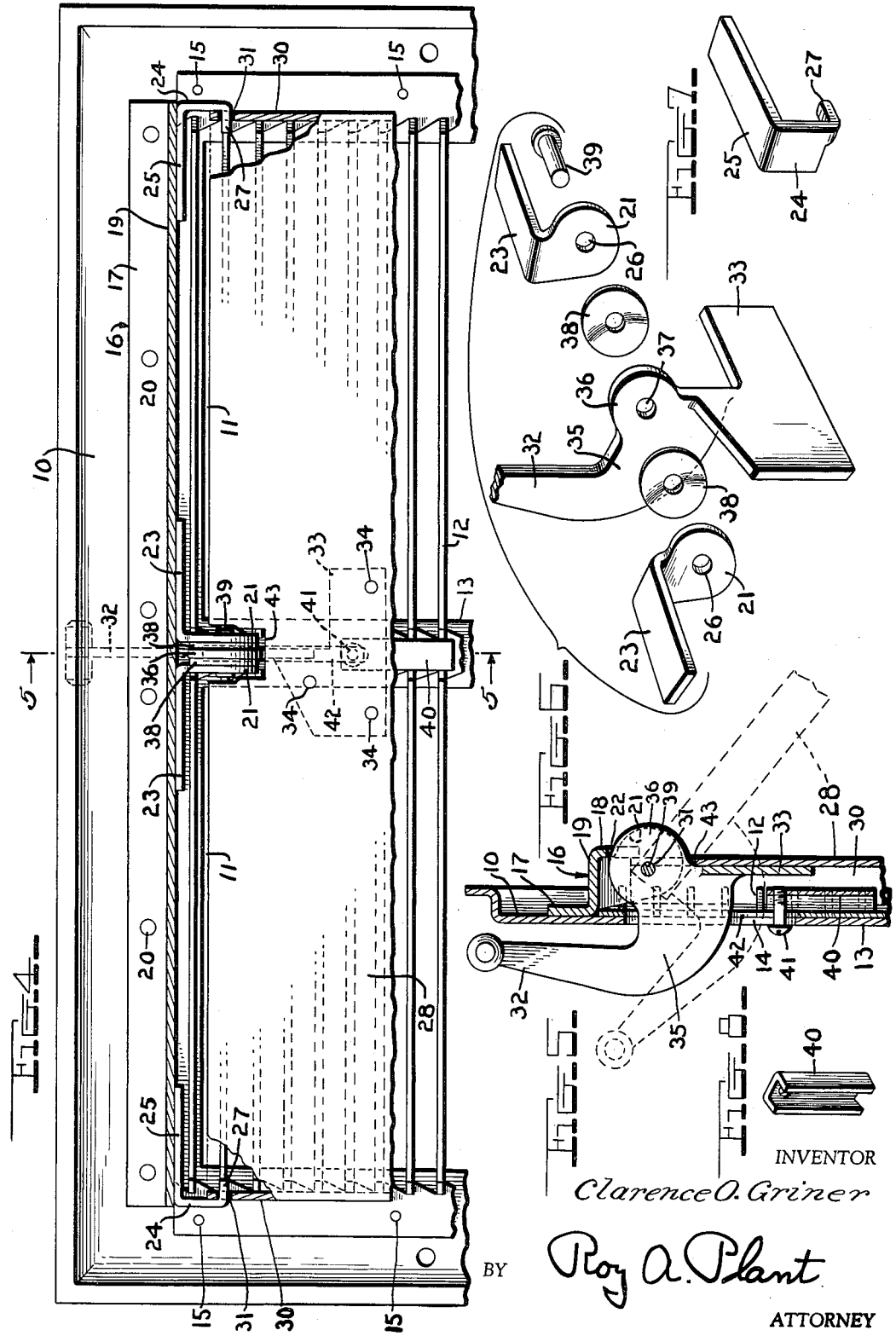
INVENTOR
Clarence O. Griner
BY Roy A. Plant
ATTORNEY United States Patent Office 2,740,348
Patented Apr. 3, 1956

2,740,348
OUTLET DAMPER ASSEMBLY

Clarence O. Griner, Ceresco, Mich., assignor to United States Register Company, Battle Creek, Mich., a corporation of Michigan Application July 6, 1953, Serial No. 366,320

8 Claims. (Cl. 98—106)

The present invention relates broadly to damper assemblies and in its specific phases to a special form of wall outlet damper or register.

Wall outlet registers and the like for heating and/or air conditioning systems are commonly provided with a single pivoted damper member for varying the discharge of air therethrough as required. Such wall outlet registers have heretofore been principally of two general types, one in which mechanical adjusting means is provided to adjust the damper and lock it in fixed adjusted position, and the other in which a handle is operably connected to the damper, which is separately pivoted, is used solely for adjusting purposes, and not for locking the damper. This latter type relies on the tightness of the final assembly to produce sufficient friction to hold the damper in adjusted position, but with wear of the frictionally engaged surfaces the friction in time becomes so weak that it will not hold the damper against creeping out of adjustment under the influence of intermittent air flow through the register, jarring, and vibration. It was a recognition of this shortcoming of conventional wall outlet registers, and the desire to produce a register not subject to such shortcoming while at the same time producing an easily operated and highly stable, long lived, damper assembly which led to the conception and development of the present invention.

Accordingly, among the objects of the present invention is the provision of a new and improved pivotal mounting means for a wall outlet register damper which will not only be longer lived than present constructions but will also effectively hold the latter frictionally in any adjusted position without requiring excessive force to operate same.

Another object is to utilize a portion of the damper adjusting and operating handle as a portion of the pivotal frictionally-held damper mounting means.

The operating handle and the associated damper mounting means are preferably disposed centrally between the ends of the damper, and a further object is to provide novel means for also pivotally mounting and supporting the ends of the damper, thereby holding the latter against warping and also preventing such springing of the damper under vibration as to produce a hum or the like.

A further object is to provide a pivotal portion of the damper mounting means with spring washers to maintain the frictional loading and long operating life of same.

A further object is to provide a novel construction which may be expeditiously manufactured, profitably marketed at a reasonable price, and easily installed and operated.

Still another object is to provide a novel adjustable stop for limiting the opening movement of the damper.

Still further objects and advantages of the present invention will appear as the description proceeds.

To the accomplishment of the foregoing and related ends, the invention, then, consists of the damper means hereinafter fully described and particularly pointed out in the claims, the annexed drawings and the following description setting forth in detail certain means for carrying out the invention, such disclosed means illustrating, however, but one of various ways in which the principle of the invention may be used.

In the annexed drawings:

Figure 1 is a front elevation of a wall outlet damper constructed in accordance with the present invention.

Figure 2 is a rear elevation of the assembly shown in Figure 1.

Figure 3 is an end elevation, partly in section, taken on line 3—3 of Figures 1 and 2, looking in the direction of the arrows.

Figure 4 is an enlarged fragmentary vertical sectional view taken on line 4—4 of Figure 3, looking in the direction of the arrows.

Figure 5 is a fragmentary transverse sectional view of the damper operator taken on line 5—5 of Figure 4, looking in the direction of the arrows.

Figure 6 is an exploded perspective view showing a preferred form of the pivotal and frictional mounting means for the damper.

Figure 7 is a perspective view of one of the pivotal mounting brackets for the ends of the damper.

Figure 8 is a perspective view of the adjustable stop for limiting the opening movement of the damper.

Figure 9 is a fragmentary rear elevation showing a modified form of the pivotal and frictional mounting means for the damper.

Preferred details of the damper construction have been shown in the various figures of the drawings, and while they will be rather specifically described for ease of understanding the principles involved, it is to be understood that some variations of the damper assembly may be made within the scope and spirit of the invention.

A front member or supporting plate 10, which for convenience has been shown in vertical position, is provided to be secured to an air-discharge head or "boot" of an air duct (not shown), or, in some instances, directly to a wall. This plate 10 may have two rectangular air discharge openings 11 closed by a conventional grill 12, and the vertically elongated, substantially central, portion 13 of said plate between said openings 11 is formed with a vertical slot 14 for a purpose to appear. The grill 12 is preferably spot-welded to the rear side of the plate 10 and some of the welds are shown at 15 in Figure 4.

A stamped-metal reinforcing and damper mounting bar 16, Figures 2 and 3, which may be either a unit portion of plate 10 or a separate part fastened thereto, and it is intended that the drawings be considered to diagrammatically illustrate same, extends horizontally behind the upper portion of the plate 10, over the openings 11. This bar has a front upstanding longitudinal flange 17, a rear downwardly projecting longitudinal flange 18 and a horizontal web 19 integrally joining said flanges 17 and 18. The front flange 17 is preferably spot-welded at 20, Figures 2 and 4, to the plate 10 when this bar 16 is produced as a separate member thus requiring fastening in place.

Two parallel vertical ears 21, Figures 4 and 6, are disposed under the web 19 at opposite sides of the slot 14, and portions of these ears project rearwardly through a notch 22, Figure 5, in the flange 18. The upper ends of these ears have integral attaching plates 23 which are spot-welded to the web 19. Two additional ears 24, Figures 4 and 7, which for convenience are made in rights and lefts, project downwardly from the ends of the web 19 and are provided with integral attaching plates 25, which are preferably spot-welded to the web 19. All of the ears 21 and 24 are in parallel vertical planes at right angles to the plate 10; the ears 21 have pivot-receiving openings 26; and the ears 24, when in final assembled position, have integral inwardly projecting pivot studs 27 alined with said openings 26.

A rectangular damper 28, Figure 5, is provided, the lower and vertical edges of this damper being respectively provided with forwardly bent reinforcing flanges 29 and 30, Figure 3, while the upper edge is flange-free. This upper edge portion of the damper 28 slightly overlaps the front side of the flange 18 of the bar 16, and the upper end portions of the vertical flanges 30, Figure 4, of said damper lie against the inner sides of the ears 24 at the ends of said bar 16. These flanges 30 have bearing openings 31 which receive the pivot studs 27, thereby pivotally mounting and supporting the ends of the damper.

An operating arm 32 is provided for the damper 28. This operating arm extends through the slot 14, Figure 1, of the plate 10 and extends upwardly in front of the upper portion of said plate. The lower end portion of the operating arm 32, Figures 4, 5, and 6, extends rearwardly to the damper 28 and is provided with an integral attaching plate 33 which is preferably spot-welded at 34 to said damper. The rearwardly extending portion 35 of the operating arm 32 is received between the ears 21 at the central portion of the bar 16 and is here shaped to provide said portion 35 wtih an ear 36 having an opening 37 alined with the openings 26 of said ears 21. Spring washers 38 (preferably of the type known as "Tinnerman" washers or nuts) are interposed between the ear 36 and the ears 21, and a rivet 39 extends through said spring washers 38 and through the openings 26 and 37 of the ears. When this rivet 39 is upset to secure it in place, it draws the ears 21 and 36 and spring washers 38 tightly together, and so tensions said spring washers 38 as to provide for a long lived and tight frictional contact between the latter and the ears, thereby providing a frictional pivotal mounting for the central portion of the damper 28, which mounting will normally hold said damper against slipping in any position to which it may be swung and yet will not be hard to operate.

If desired, an ordinary bolt, lock washer, and nut could well be used for this pivot instead of the rivet 39. Also, only one spring washer could be used if desired, but the rivet and the two spring washers are preferable since normally they will give satisfactory stabilized operation over a longer period of time.

As the operating arm 32 is moved in damper-opening direction, it swings downwardly as will be seen from the dotted line position of Figure 5. Therefore, the provision of a simple, adjustable stop in the downward path of the arm 32 will serve to limit the opening movement of the damper as required. Such a stop 40 is shown in Figures 3, 5, and 8. This stop 40 which is preferably in channel form as shown, for great stability, lies against the rear side of the portion 13 of the plate 10 and is adjustably mounted, in preferred construction, by means of a headed screw 41 which extends through the slot 14 of said plate 10, for maximum adjustability, and is threaded into the web of said stop 40.

When the grill 12 is stamped from a single sheet metal plate, as herein shown, it will be formed with a slot 42, Figures 4 and 5, registering with the slot 14 of the wall plate 10, and the screw 41 and operating arm 32 will extend through both slots. Also, as the ears 21 and 36 are preferably of about the size shown in Figure 4, 5, and 6 and therefore must project rearwardly beyond the damper 28, said damper is formed with a notch 43 to accommodate said ears.

Where it is desired to finish all of the main damper parts with enamel or the like before final assembly, the combination fragmentarily shown in Figure 9 is an ideal arrangement. Here the damper 28a is provided with perforated ears 44 at its upper side edges, and the horizontal web 19 is likewise provided with matching perforated ears 45. The assembly is then pivotally joined at these points by means of rivets 46. Attaching plates 23 are spaced apart so as to tightly fit against the opposite sides of rearwardly extending ear 36 of operating arm 32 while permitting relative rotation of same. Passing through these plates 23 and ear 36, in axial alinement with rivets 46, is a bolt 39a carrying a spring type "Tinnerman" nut on its outer end so that variable tightening of bolt 39a will adjustably vary the frictional grip of the inner faces of plates 23 on ear 36 and hold damper 28a in various adjusted positions.

From the foregoing it will be seen that a very simple, effective, novel, and advantageous damper construction has been provided for attaining the desired ends, and while preferences have been disclosed by way of an assembly having a single swingable damper member 28, attention is again invited to the possibility of making variations, some of which have been mentioned, within the scope of the invention. The directional terms "upper," "downward," "vertical," "front," "rear," et cetera, are also to be considered as purely explanatory and not limiting on the construction illustrated and described.

Other modes of applying the principle of my invention may be employed instead of those explained, change being made as regards the damper assembly and combinations herein disclosed, provided the means stated by any of the following claims or the equivalent of such stated means be employed.

I therefore particularly point out and distinctly claim as my invention:

1. A damper assembly comprising a support means having an opening therethrough, a damper behind said support means for totally or partially closing said opening, pivot means carried by said support means and engaging the side portions of said damper adjacent its upper edge, an operating arm secured to said damper and extending accessibly to the front side of said support means, said arm having a portion disposed in a plane substantially at a right angle to the front side of said support means, and a frictional pivotal connection between said arm and said support means, said connection comprising a pair of parallel ears disposed at opposite sides of said portion of said arm which is substantially at a right angle to the front side of said support means, said ears being fixedly mounted on said support means, at least one resilient means applying frictional pressure in said connection, and a pivot member extending through said ears, resilient member, and said portion of said arm, said last named pivot being substantially in pivotal alinement with said first named pivot means.

2. A structure as specified in claim 1; said resilient means being in the form of a spring means mounted on one end of said pivot member extending through said arm portion and said ears for frictionally holding said arm portion and said ears in variable rotated relative position.

3. A structure as specified in claim 1; said resilient means being in the form of a pair of spring washers mounted on said pivot at both ends thereof and interposed between said portion of said arm and said ears, said spring washers contacting frictionally with said arm portion and said ears.

4. A damper assembly comprising a plate having an opening therethrough, a damper behind said plate, a reinforcing and damper mounting bar secured to the rear side of said plate at the upper edge of said opening, downwardly projecting pivot members carried by said damper mounting bar and pivotally engaging the side edge portions of said damper adjacent its upper edge, two parallel ears secured to the central portion of said bar and projecting downwardly therefrom, said ears being disposed in planes at right angles to the plane of said plate, and a pivotal connection between said damper and said ears, said pivotal connection comprising a member carried by said damper and disposed between said ears, a resilient means applying frictional pressure in said pivotal connection, and a pivot member extending through said ears, resilient means, and said member carried by said damper, said pivot member being in pivotal alinement with said pivot members engaging the side edge portions of said damper adjacent its upper edge.

5. A structure as specified in claim 4; said resilient means being in the form of a spring washer on one end of said pivot member extending through said ears and member carried by said damper, said spring washer exerting frictional pressure on said member and said ears.

6. A structure as specified in claim 4; said resilient means being in the form of two spring washers mounted on said pivot member at both ends thereof between said damper carried member and said ears, each of said spring washers contacting frictionally with said member and each contacting frictionally with one of said ears.

7. A structure as specified in claim 4; said pivot members engaging the upper side edges of said damper having inturned pivot studs integral with their lower ends, the ends of said damper having bearing openings receiving said pivot studs.

8. A structure as specified in claim 4; said member on said damper also having a portion in the form of an arm extending through said plate to the front thereof for adjusting said damper about said pivotal connection.

References Cited in the file of this patent
UNITED STATES PATENTS

| | | |
|---|---|---|
| 829,070 | Hansen | Aug. 21, 1906 |
| 1,350,423 | Runkel | Aug. 24, 1920 |
| 1,844,520 | Olinger | Feb. 9, 1932 |
| 2,541,346 | De Roo | Feb. 13, 1951 |
| 2,697,977 | Brumbaugh | Dec. 28, 1954 |